United States Patent
Adiga et al.

(10) Patent No.: US 8,693,615 B2
(45) Date of Patent: *Apr. 8, 2014

(54) RAM-BASED EVENT COUNTERS USING TRANSPOSITION

(71) Applicant: International Business Machines Corporation, Armonk, NY (US)

(72) Inventors: Narasimha R. Adiga, Bangalore (IN); Peter H. Hochschild, New York, NY (US); Ashutosh Misra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/716,711

(22) Filed: Dec. 17, 2012

(65) Prior Publication Data

US 2013/0145200 A1  Jun. 6, 2013

Related U.S. Application Data

(63) Continuation of application No. 13/312,627, filed on Dec. 6, 2011, now Pat. No. 8,345,816.

(51) Int. Cl.
  *G06M 3/00* (2006.01)
(52) U.S. Cl.
  USPC .............................. 377/26; 377/49; 719/318
(58) Field of Classification Search
  USPC ....................................... 377/26, 49; 719/318
  See application file for complete search history.

(56) References Cited

U.S. PATENT DOCUMENTS

| | | | |
|---|---|---|---|
| 4,117,834 A | 10/1978 | Mc Partland et al. | |
| 4,206,346 A | 6/1980 | Hirosawa et al. | |
| 4,751,721 A | 6/1988 | Wissell | |
| 5,089,957 A | 2/1992 | Stultz et al. | |
| 7,426,253 B2 | 9/2008 | Gara et al. | |
| 7,688,931 B2 | 3/2010 | Gara et al. | |
| 7,877,759 B2 | 1/2011 | Gara et al. | |
| 8,295,428 B2 * | 10/2012 | Hutchings et al. | 377/26 |
| 2009/0116611 A1 | 5/2009 | Gara et al. | |
| 2010/0027735 A1 | 2/2010 | Bender et al. | |
| 2010/0269123 A1 | 10/2010 | Mejdrich et al. | |

OTHER PUBLICATIONS

B.J. Nathanson, "Event Counter Using Few Chips", IP.com No. IPCOM000102277D, Electronic Publication: Mar. 17, 2005, 3 pages, (IBM Technical Disclosure Bulletin, vol. 33, No. 6A, pp. 288-289, (Original Publication Date: Nov. 1990).

* cited by examiner

*Primary Examiner* — William Hernandez
(74) *Attorney, Agent, or Firm* — Michael LeStrange; Roberts Mlotkowski Safran & Cole, P.C.

(57) ABSTRACT

Methods and structures that implement an event counter in a RAM are provided. A method includes providing a count-RAM, a carry-RAM, and a pre-counter corresponding to an event source. A column in the count-RAM and a column in the carry-RAM represent a value of a value of the event counter. The method further includes storing a count of the event counter received via the pre-counter in the count-RAM and the carry-RAM in a transposed, bit-serial format, such that location zero of the count-RAM and the carry-RAM counts the least significant bit (LSB) of the event counter.

18 Claims, 7 Drawing Sheets

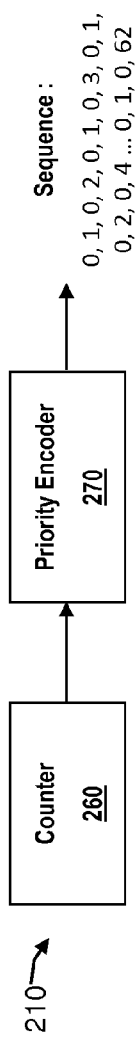

RAM-BASED EVENT COUNTERS USING TRANSPOSITION

FIELD OF THE INVENTION

The present invention generally relates to computer systems and, more particularly, to event counters that are employed in connection therewith.

BACKGROUND OF THE INVENTION

An event counter is a unit that counts occurrences of a certain condition. They may be used for statistical counts, debugging and performance characterization. The information attained from event counters is used in computing systems to, for example, resolve performance bottlenecks and fine-tune configurable parameters. Event counters are also used to trigger actions in computers. For example, when an event counter reaches a certain threshold, it could be used to generate an interrupt.

Managing and controlling high-speed systems can involve precise, simultaneous counts of hundreds of conditions that generate billions of events in a short period of time. Counting such large numbers of events entails a correspondingly large number of high-volume counters (e.g., 64-bit counters). However, hundreds of large counters occupy a significant amount of space in an integrated circuit (e.g., an application-specific integrated circuit (IC)). In the case of a field-programmable gate array (FPGA) devices, where there are limited numbers of logic building blocks (e.g., Look-Up Tables, or LUTs), the hundreds of counters consume a very significant number of the logic blocks.

An event counter may use a combination of a pre-counters and a single random access memory (RAM), wherein a state machine sweeps serially through the pre-counters and adds their contents to a corresponding value in RAM. In such event counters, the width of each pre-counter must be large enough that, when counting events in a high-speed system, the pre-counter will not overflow between sweeps of the state machine. That is, if counts accumulate in the pre-counters faster than they are moved into the RAM, the count information will overflow the pre-counters. As such the pre-counters must include a large number of registers to ensure that no information is lost. In an event counter that tracks a large number of events, this system may demand a large amount of space in an IC due to the size of the pre-counters.

Accordingly, there exists a need in the art to overcome the deficiencies and limitations described hereinabove.

SUMMARY OF THE INVENTION

In an aspect of the invention, a method of implementing an event counter in a RAM, comprises providing a count-RAM, a carry-RAM, and a pre-counter corresponding to an event source, wherein a column in the count-RAM and a column in the carry-RAM represent a value of a value of the event counter. The method further comprises storing a count of the event counter received via the pre-counter in the count-RAM and the carry-RAM in a transposed, bit-serial format, such that location zero of the count-RAM and the carry-RAM corresponds to a least significant bit (LSB) of the event counter.

In another aspect of the invention, a method comprises implementing a plurality of event counters using RAM. The method further comprises providing a plurality of pre-counters corresponding to respective event counters and respective columns in a count-RAM and a carry-RAM, wherein each column in the count-RAM and the carry-RAM represents a corresponding one of the event counters in a transposed, bit-serial format, such that zero locations of the count-RAM and the carry-RAM corresponds to the least significant bits (LSB) of the event counters. The method further comprises updating the plurality of pre-counters in parallel. The method further comprises performing full-bit additions of the plurality of pre-counters in parallel. The method further comprises updating the row bits of the count-RAM and the row bits of the carry-RAM in parallel with results of the full-bit additions from the corresponding pre-counters.

In another aspect of the invention, a counting system comprises a plurality of pre-counters, a first random access memory (RAM) and a second random access memory (RAM). Each of the plurality of pre-counters corresponds to a respective one of a plurality of event counters. In addition, a value of each of the plurality of event counters is defined by a respective column of the first RAM and the second RAM.

BRIEF DESCRIPTION OF THE SEVERAL VIEWS OF THE DRAWINGS

The present invention is described in the detailed description that follows, in reference to the noted plurality of drawings by way of non-limiting examples of exemplary embodiments of the present invention.

FIG. 2B shows a scheduler in accordance with aspects of the invention;

FIG. 2C shows exemplary sequence information determined by the scheduler in accordance with aspects of the invention;

DETAILED DESCRIPTION

Figure 1:
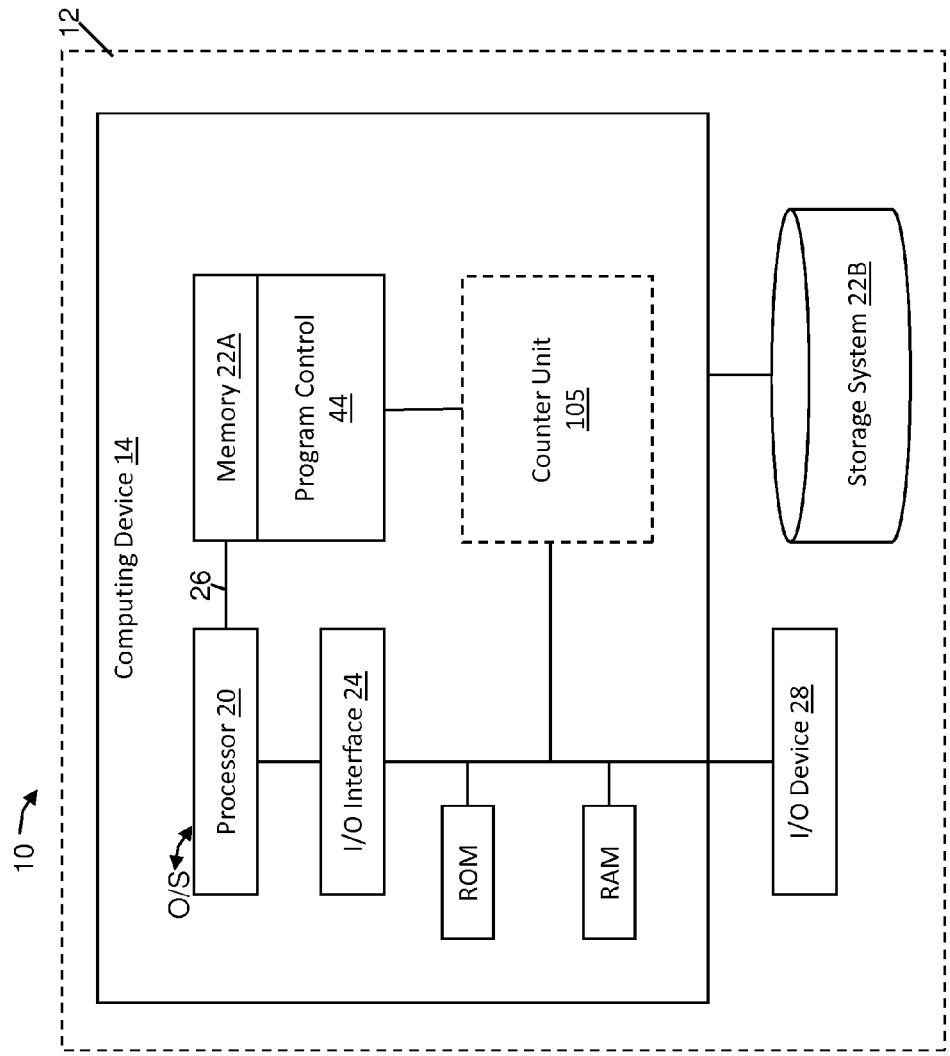
FIG. 1 shows an illustrative environment for implementing designs and steps in accordance with aspects of the invention.

The present invention generally relates to computer systems and, more particularly, to event counters that are employed in connection therewith. According to aspects of the present invention, a counter unit includes pre-counters, a count-RAM (random access memory) and a carry-RAM that record counts from multiple event sources in parallel. Since counts are recorded to the RAMs in parallel, the size of the pre-counters may be small (e.g., 2-bits), thereby reducing the number of components (e.g., flip-flops) included in the event counter.

An event source is any device or system that produces event pulses upon the occurrence of a certain condition. For instance, an event source may count bit errors in a high-speed communication serial link having several channels wherein each occurrence of a bit error in a channel is considered an event. The event pulses are synchronous logic signals in which each pulse represents the occurrence or non-occurrence of an event during a clock cycle. A logic-high (i.e., "1") may indicate that an event has occurred, whereas a logic-low (i.e., "0") may indicate that no event has occurred.

According to aspects of the invention, the counts for each event source are stored vertically in the RAMs (e.g., in columns) using a transposed, bit-serial format such that location zero (i.e., row zero) of the count-RAM and the carry-RAM corresponds to the least significant bit (LSB) of the event counter. Embodiments use the vertical, transposed format to split event counts between the count-RAM and the carry-RAM based on the propagation length of the bit serial data. That is, the value of each count in the counter unit is represented by the combination of a column in the count-RAM and a column in the carry-RAM, as well as the values in the corresponding pre-counter, such that the actual counter value is a combination of all three.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable mediums having computer readable program code embodied thereon.

Any combination of one or more computer readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer-readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is an exemplary environment 10 for implementing systems and processes in accordance with aspects of the invention. The environment 10 includes a server or other computing infrastructure 12 that can perform the processes described herein. In particular, the computer infrastructure 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories that provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and a storage system 22B. For example, the I/O device 28 can comprise any device that enables an individual to interact with the computing device 14

(e.g., user interface) or any device that enables the computing device 14 to communicate with one or more other computing devices using any type of communications link. The external I/O device/resource 28 may be for example, a handheld device, PDA, handset, keyboard etc. In accordance with embodiments of the invention, external I/O device/resource 28 may be a digital input/output interface that receives event pulses from event sources in parallel and places them on a parallel data bus communicatively couple to the counter unit 105. In embodiments, the counter unit 105 includes event counters that count events received from event sources. As described in detail below, each event counter includes a pre-counter (e.g., a two-bit flip-flop) that receives counts (e.g., event pulses) from the respective one of the event sources. A count-RAM and a carry-RAM store the received counts vertically (i.e., in columns) in a transposed format, such that each column of the count-RAM and the carry-RAM corresponds to a respective event source and pre-counter. The value of each event counter is a combination of the values stored in the columns of the respective count-RAM and carry-RAM.

In general, the processor 20 executes computer program code (e.g., program control 44), which can be stored in the memory 22A and/or storage system 22B. Moreover, in accordance with aspects of the invention, the program control 44 controls counter unit 105, e.g., the system and processes described herein. The counter unit 105 can be implemented as hardware, as software, or as a combination of the two. In embodiments, the counter unit 105 may be implemented as separate dedicated processors or a single or several processors. In other embodiments, the counter unit 105 is one or more sets of program code in the program control 44 stored in memory 22A as separate or combined modules. Additionally, in embodiments, some functions of the counter unit 105 may be implemented as program code and other functions may be implemented as hardware.

While executing the computer program code, the processor 20 can read and/or write data to/from memory 22A, storage system 22B, and/or I/O interface 24. The program code executes the processes of the invention. In embodiments, the program code execute processes for controlling the counter unit 105, such as reset or initialization. Further, the program code may execute processes for providing information to the counter unit 105, such as count pulses received from event sources via I/O device 28. Further, in embodiments, some or all of the functions of the counter unit 105 are implemented in program code executed by the processor 20. The bus 26 provides a communication link between each of the components in the device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the computing infrastructure 12 comprises two or more computing devices (e.g., a server cluster) that communicate over any type of communications link, such as a network, a shared memory, or the like, to perform the process described herein. Further, while performing the processes described herein, one or more computing devices on the computing infrastructure 12 can communicate with one or more other computing devices external to the computing infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2A:
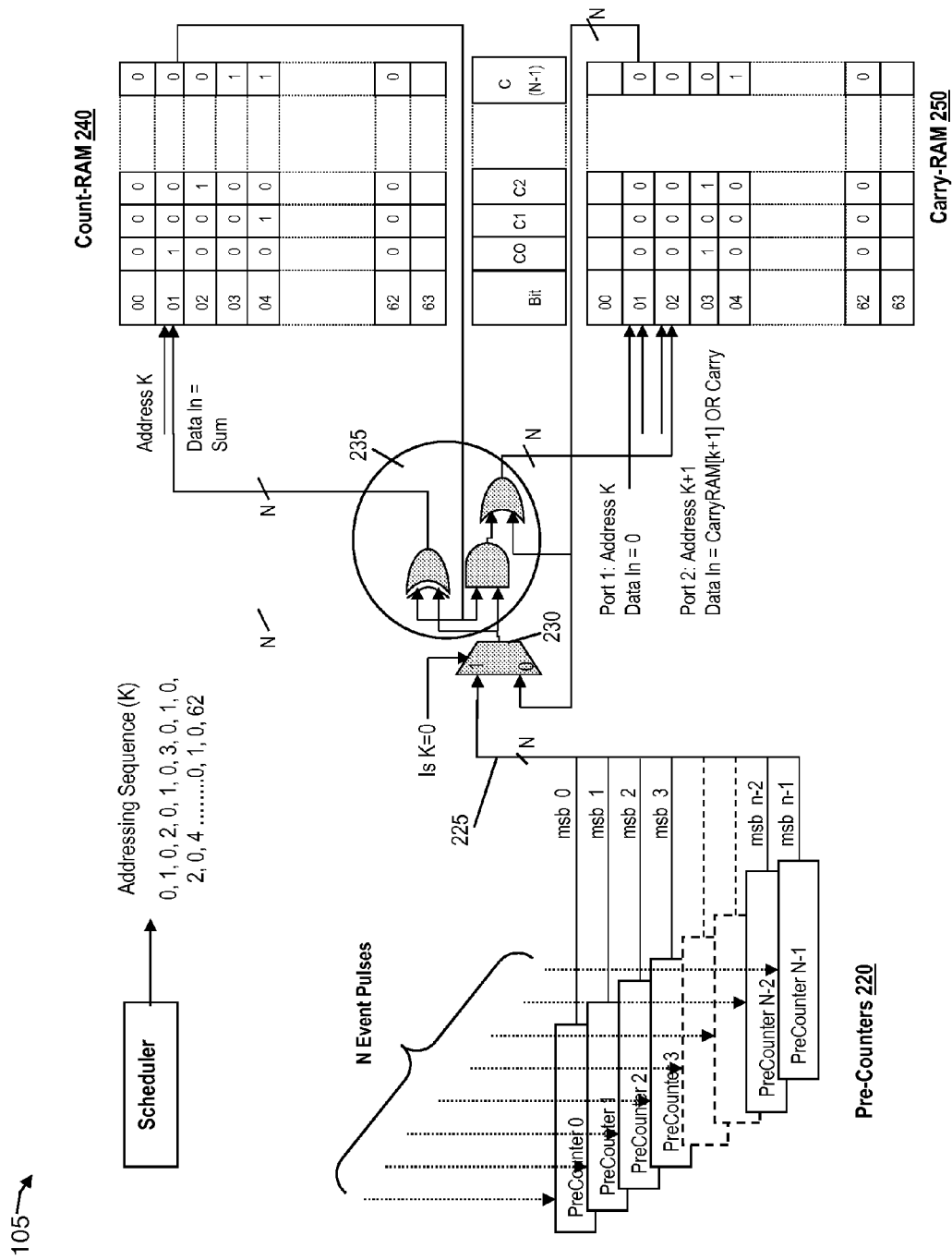
FIG. 2A shows a counter unit in accordance with aspects of the present invention.

FIG. 2A shows an exemplary counter unit 105 in accordance with aspects of the invention. The counter unit 105 includes a number of pre-counters 220, a count-RAM 240 and a carry-RAM 250 that, in combination, store counts for a number of event sources. More specifically, in the exemplary embodiment shown in FIG. 2A, the counter unit 105 includes a scheduler 210, the pre-counters 220, a data lines 225, one or more multiplexers 230, full-bit adders 235, the count-RAM 240 and the carry-RAM 250 that are communicatively linked. According to exemplary embodiments for recording counts from up to N event sources (N being a positive integer), the counter unit 105 provides N counters of 64-bits each and the counter includes the following elements: a 63-bit deep, a N-bit wide RAM (e.g., arranged as the count-RAM 240); a 62-bit deep, N-bit wide RAM (e.g., arranged as the carry-RAM 250); N 2-bit flip-flop or 2*N flip-flops (e.g., arranged as the pre-counters 220), N data lines 225, N multiplexers (e.g., multiplexer 230) and N full-bit adders (e.g., adders 235). It should be noted that, while a 63-bit deep, a N-bit wide RAM and a 62-bit deep, N-bit wide RAM are described in this example, larger RAMs (e.g., 64-bit) may be employed while leaving some bit unused.

In embodiments, the counter unit 105 records counts received via the pre-counters 220 (e.g., PreCounter0 to PreCounter N−1) into corresponding columns of the count-RAM 240 and the carry-RAM 250 (e.g., C0 to C(N−1)) by visiting (i.e., addressing) locations in these RAMs according to a predetermined visit schedule (K). The counts may be received, for example, by computing device 14 via I/O device 28 and provided to the counter unit 105 using the bus 26. Based on the value of K, the counter unit 105 visits bit-position K in the count-RAM 240 and the carry-RAM 250, once, after it visits bit position K−1 twice. According to this schedule, the counter unit 105 visits location "0" every other cycle; location "1" every fourth cycle, location "2" every eighth cycle, and so on.

The scheduler 210 is any combination of a software program and hardware modules that generates the visit schedule (K) defining the sequence in which locations of the count-RAM 240 and carry-RAM 250 are visited by the counter unit 105. According to aspects of the invention, the visit schedule (K) is 0, 1, 0, 2, 0, 1, 0, 3, 0, 1, 0, 2, 0, 4 . . . 0, 1, 0, 62. In embodiments, the scheduler 210 may be program code that, when executed by the processor 20, generates the visit schedule (K). The program code may generate the visit schedule on a per-cycle basis such that, for each iteration of a count cycle, the counter unit 105 increments the value of K in the sequence. Alternatively, the visit schedule may be recorded in, for example, computer memory 22A and retrieved by the scheduler 210 on a per-cycle basis. Alternatively, the scheduler 210 is a hardware module, including a free-running counter and a priority encoder, which produces the visit schedule.

In accordance with aspects of the invention, the pre-counters 220 are any combination of a software program and hardware modules that, in parallel, incrementally count event pulses received from the event sources. Each pre-counter 220 receives event pulses (i.e., counts) from a single event source. In other words, each of the event sources (0 to N−1) provides an event pulse that is mapped to a corresponding pre-counter 220. The pre-counters 220 (e.g., counter 0 to counter N−1) receive a stream of event pulses (e.g., event 0 to event N−1) from a corresponding event source. As shown in FIG. 2A, all the pre-counters 220 receive event pulses even though the number of pulses may be less than the number of pre-counters. In embodiments, the pre-counters 220 are two-bit flip-flops or registers. Accordingly, for a particular event pulse in a clock cycle, each event pulse causes a corresponding pre-counter to increment by 1 (e.g., 0-0, 0-1, 1-0, 1-1).

Each of the pre-counters 220 is communicatively linked by data lines 225 to corresponding one of multiplexers 230 and provides the most significant bit (MSB) of each pre-counter 220 in parallel. In embodiments, the pre-counters 220 and respective multiplexers 230 are linked by a number (N) of data lines 225, each of which corresponds to a respective one of the pre-counters 220 such that all the MSBs of the pre-counters 220 may be communicated in a single clock cycle. For instance, for a counter unit 105 having sixty-four (64) event counters, there may be 64 data lines.

The multiplexers 230 are any combination of a software program and hardware modules that compare the current value of the visit schedule (K) from the scheduler 210 with each of the MSBs held in the register 225. For a counter unit 105 having N event counters, there are N multiplexers 230, each respective multiplexer 230 corresponding to a respective one of the pre-counters 220 and a respective one of the full-bit adders 235. Based on the current value of the visit schedule (K), the multiplexers 230 cause the counter unit 105 to, in parallel, selectively obtain count values from the pre-counters 220 and store the count values in respective columns of the count-RAM 240 and the carry-RAM 250.

The full-bit adders 235 are any combination of a software program and hardware modules that add binary numbers to provide their sum, as well as account for a carried value (i.e., "carry") that may be generated by the addition of binary values. For example for inputs 0 and 0, the sum is 0 and the carry is zero. For inputs 0 and 1, the sum is 1 and the carry is zero. Likewise, for inputs 1 and 0, the sum is 1 and the carry is zero. For inputs 1 and 1, the sum is 1 and the carry is 1. In accordance with aspects of the present invention, there are N full-bit adders, each respective one of the full-bit adders 235 corresponding to a respective one of the pre-counters 220 and multiplexers 230. The sum information output from the full-bit adders 235 is provided, in parallel, to the count-RAM 250 and the carry values information output from the full-bit adders 235 are provided to the carry-RAM 240. The sum and the counts are stored in the respective column bit of the RAMs 240 and 250 at locations determined by the current value of the visit schedule (K).

According to aspects of the invention, an implementation of N counters, each of which are M-bit in size, includes a count RAM 240 is at least a N bit wide, M−1 deep dual-port RAM, and a carry-RAM 250 is at least an N bit wide M−2 deep dual-port RAM. A dual-port RAM includes a read-port and a write-port that operate simultaneously. In other words, information may be written to and read from a dual-port RAM at the same time. Thus, according to aspects of the current invention in which information is vertically stored in the columns of the RAMs 240 and 250, the count information of the event sources may be updated by writing to one bit (e.g., bit 02) while, during the same clock cycle, information may be read from another bit (e.g., bit 01).

While the counter unit 105 in FIG. 2A shows the count RAM 240 and the carry RAM 250 as dual-port RAMs, embodiments of the invention may be implemented without dual-port RAMS. In such embodiments, the counter unit 105 can be implemented using a single-port (for write & read access) Count RAM and a single-port Carry RAM along with 3-bit pre-counters 220. Such embodiments may be useful when dual port RAMs are unavailable.

FIG. 2B shows an exemplary scheduler 210 in accordance with aspects of the invention. As discussed above, the scheduler 210 generates the visit schedule (K) defining the sequence in which locations of the count-RAM 240 and carry-RAM 250 are visited during counting by the counter unit (e.g., counter unit 105). According to aspects of the invention, the scheduler 210 is a synchronous device including a free-running counter 260 and a priority encoder 270. The free-running counter 260 may be N-bits wide (e.g., 64-bit corresponding to the size of the RAMs) that, for each clock cycle, increments by 1 starting from zero after initialization. The priority encoder 270 is operatively connected to the free-running counter 260 and is configured to output a least significant bit of the free-running counter 260 that is a zero (0) in the count cycle, which produces the visit schedule (K) for each event cycle of the event counter. For example, as shown by table 280 in FIG. 2C, the scheduler 210 outputs the above-described sequence for K (i.e., 0, 1, 0, 2, 0, 1, 0, 3, 0, 1, 0, 2, 0, 4 . . . 0, 1, 0, 62).

Flow Diagrams

Figure 3:
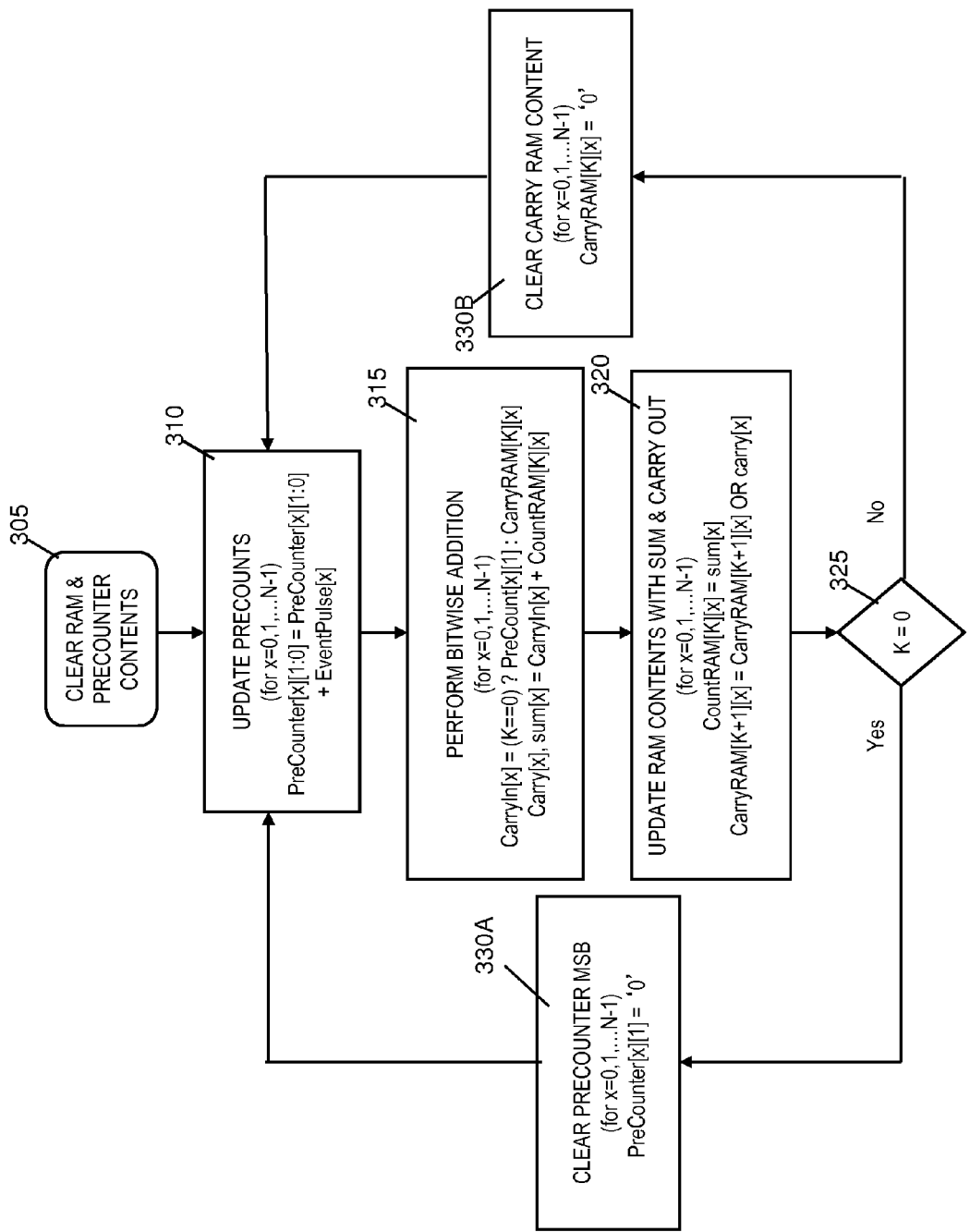
FIG. 3 shows a flow diagram of an exemplary process for implementing designs and steps for a counter in accordance with aspects of the invention.

FIG. 3 shows an exemplary flow for performing aspects of the present invention. The steps of FIG. 3 may be implemented in the environment of FIG. 1 and using the exemplary counter unit 105 illustrated in FIG. 2A, for example.

The flowchart in FIG. 3 illustrates the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environments of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

FIG. 3 shows a flow diagram of an exemplary process for implementing designs and steps for a counter. According to aspects of the invention, count information included in event pulses from a number of event sources is received by a corresponding pre-counter (e.g., pre-counter 220) and stored in count-RAM (e.g., count-RAM 240) and carry-RAM (e.g., carry-RAM 250) based on the predetermined visit schedule (K). More specifically, at step 305, the counter unit (e.g., counter unit 105) resets and/or clears (i.e., zeroes) the scheduler, the pre-counters, the count-RAM and the carry-RAM. The values held in the counter unit are set to zero to place the counter unit in a known state and ensure the counters are empty (i.e., include no vestiges of previous counts). Further, the counter unit resets the scheduler to an initial state such that the scheduler restarts the visit schedule.

At step 310, the counter unit updates each pre-counter with the current value of the corresponding event pulse (e.g., Pre-counter[x]=Pre-counter[x]+EventPulse[x]). If an event has occurred, the value of the corresponding event pulse in that cycle is a logical "1", and the value of the corresponding pre-counter is incremented by 1. On the other hand, if no event has occurred, the value of the corresponding event pulse in that cycle is a logical "0", and the value of the corresponding pre-counter is not incremented.

At step 315, the counter unit selectively performs full-bit addition of each pre-counter and/or the corresponding contents of the RAMs based on the current value of the visit schedule K. When the value of K is equal to zero, the values of the most significant bits (MSBs) of the pre-counters received from the register are added in parallel by the full-bit adders to the values of the corresponding count-RAM at bit-positions K (e.g., (carry, sum)=precount[msb]+count-RAM[K]). When the value of K does not equal zero, the values of the carry-RAM are full-bit added in parallel to the corresponding values of the count-RAM at bit positions K (e.g., (carry, sum)=carryRAM[K]+countRAM[K]).

At step 320, the counter unit updates the contents of the carry-RAM and the count-RAM using the values of carry and sum determined by the full-bit adders in step 315. Whenever bit position K is visited according to the visit schedule, the counter bit K in counter-RAM is added with the carry bit k in the carry-RAM, producing a sum value that is stored in counter-RAM at bit position K. Further, the full-bit adder produces a carry value that is stored in the next location of the carry-RAM (i.e. at bit position K+1). With regard to the carry-RAM, at address K, a zero is stored. And, at address K+1, either the value CarryRAM[k+1] or the value of the carry value generated by the corresponding adder 235 is stored, depending on K.

At step 325, the counter unit determines the value of the visit schedule (K) before returning the process to step 310 and beginning another iteration of the count cycle depending on the current value of K. When K is equal to zero at step 325, then at step 330A, the pre-counter MSBs are cleared prior to starting the next cycle at step 410 (i.e., pre-counter[x][1]='0'). When K is not equal to zero at step 325, then at step 330B the carry-RAM content is cleared at position K (i.e., CarryRAM[K][x]='0').

According to aspects of the invention, the counter unit performs the process shown in FIG. 3 based on the following pseudo code:

(1)  /Initialize and Clear/
(2)  Zero-out counters
(3)  Reset scheduler
(4)  Generate sequence k => 0, 1, 0, 2, 0, 1, 0, 3, 0, 1, 0, 2, 0, 4 ... 0, 62
(5)  /Update PreCount/
(6)  PreCount(1:0) = PreCount(1:0) + Event Pulse
(7)  /Perform bitwise addition/
(8)  If k≠0, (Carry, Sum) = CarryRAM[k] + CountRAM[k]
(9)  If k = 0, (Carry, Sum) = PreCount[1] + CountRAM[k]
(10) /Update CountRAM/
(11) CountRAM[k] = Sum
(12) /Update CarryRAM/
(13) CarryRAM[k+1]= CarryRAM[k+1] or Carry
(14) /Cycle based on k/
(15) /Clear PreCount Carry if k=0/
(16) If k=0, Pre-counter[x][1]=0
(17) //Clear CarryRam Content if k≠0/
(18) If k≠0, CarryRAM[k][x]=0
(19) Goto /Update PreCount/

Figure 4A:
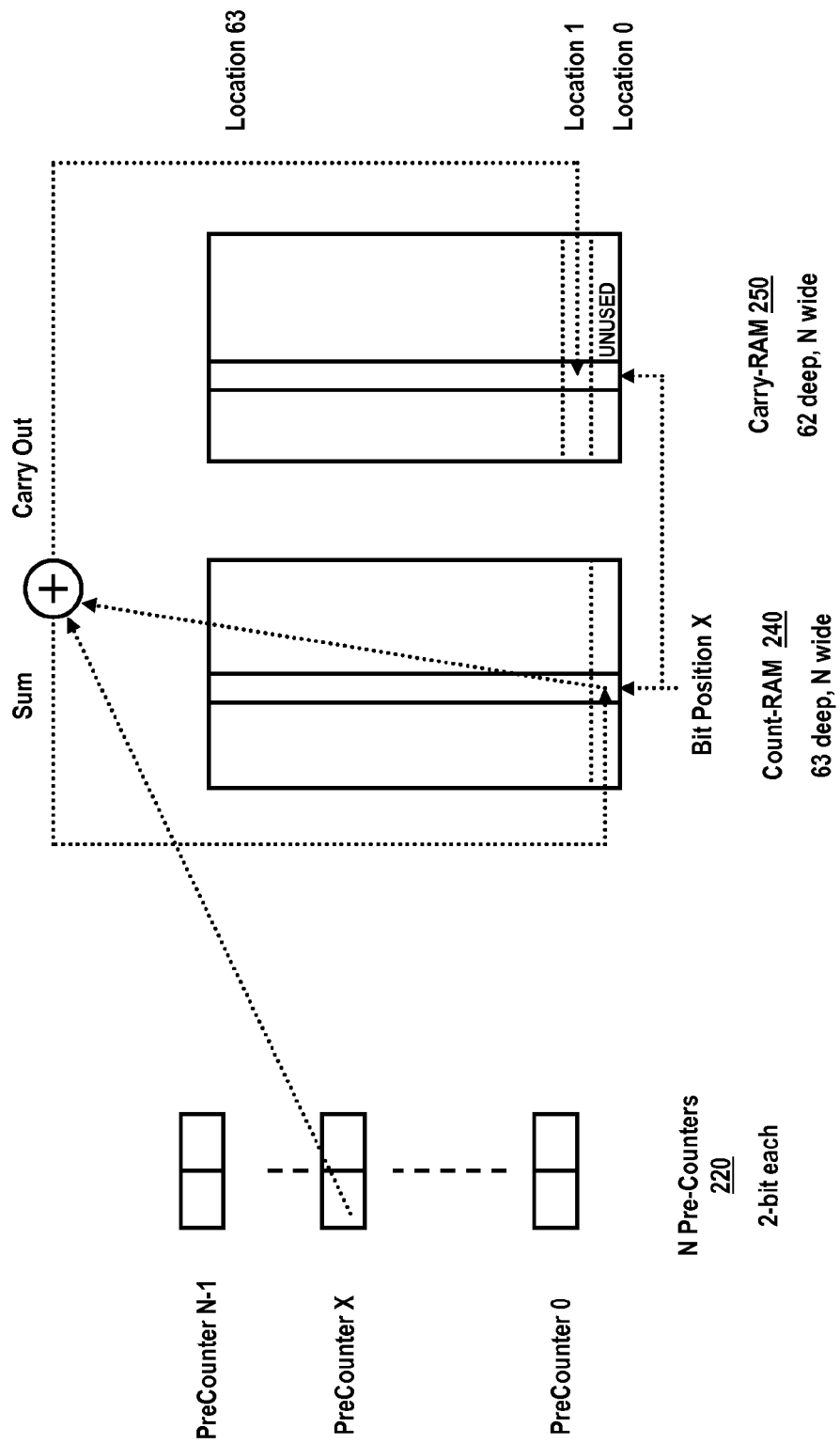
FIGS. 4A and 4B show block diagrams of exemplary processes for implementing designs and steps for an adder in accordance with aspects of the invention.

FIG. 4A shows an example of the addition step 315 and update step 320 in FIG. 3 when K equals zero for a particular pre-counter X and for corresponding bit positions [X] in the count-RAM and the carry-RAM. When K equals zero, the MSB of the pre-counter X is full-bit added to value the corresponding bit position [X] of the count-RAM (e.g., by the corresponding adder 235). The full-bit addition produces two values: a sum and a carry. The sum is used to update the count-RAM at bit position X and the carry is used to update the carry-RAM at bit position X.

Figure 4B:
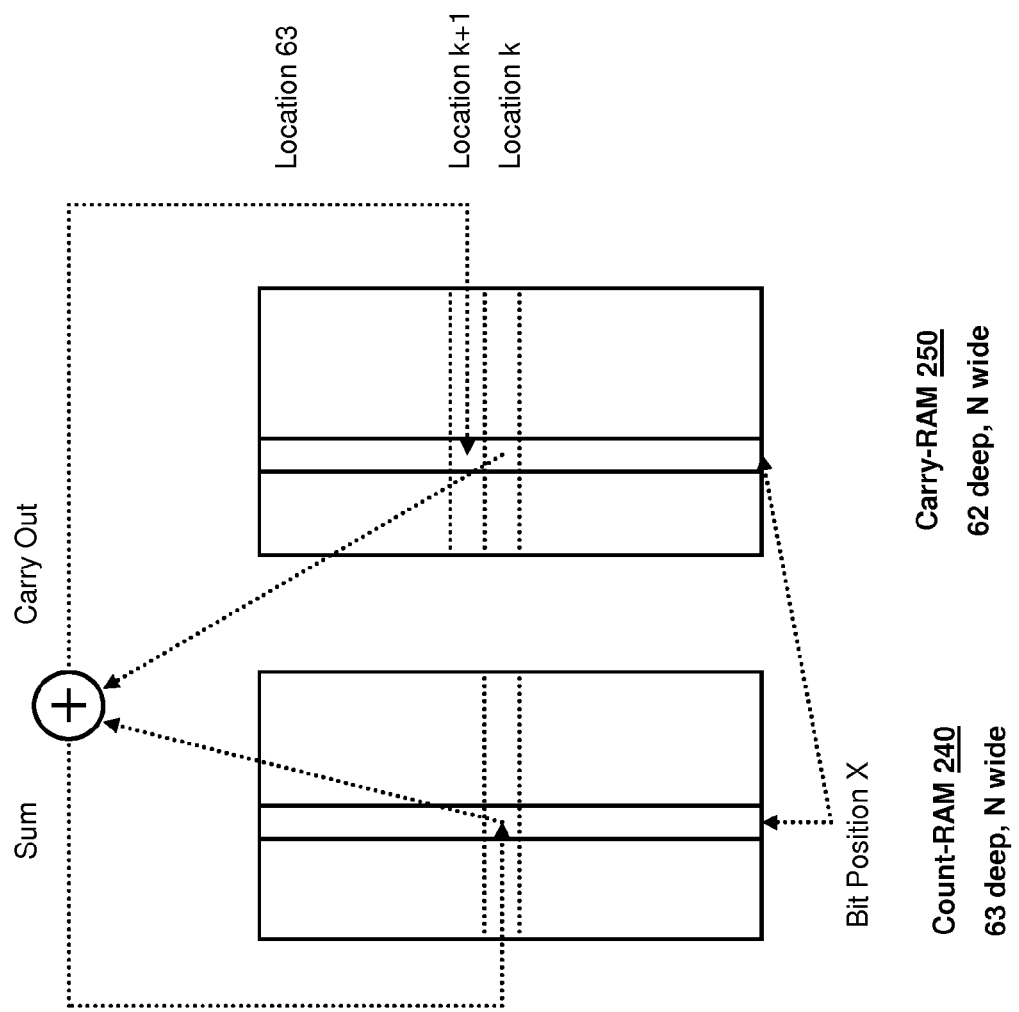

FIG. 4B shows an example of the addition step 315 and update step 320 in FIG. 3, when K is not equal to zero for a particular bit position [X] in the count-RAM and the carry-RAM. When K does not equal zero, the value of the corresponding bit position [X] in the count-RAM and the carry-RAM at location K are full-bit added (e.g., by adder 235). The addition produces two values: a sum and a carry. The sum is used to update the count-RAM for bit position [X] at address K. The carry is used to update the carry-RAM 250 for bit position [X] at address K+1.

Figure 5:
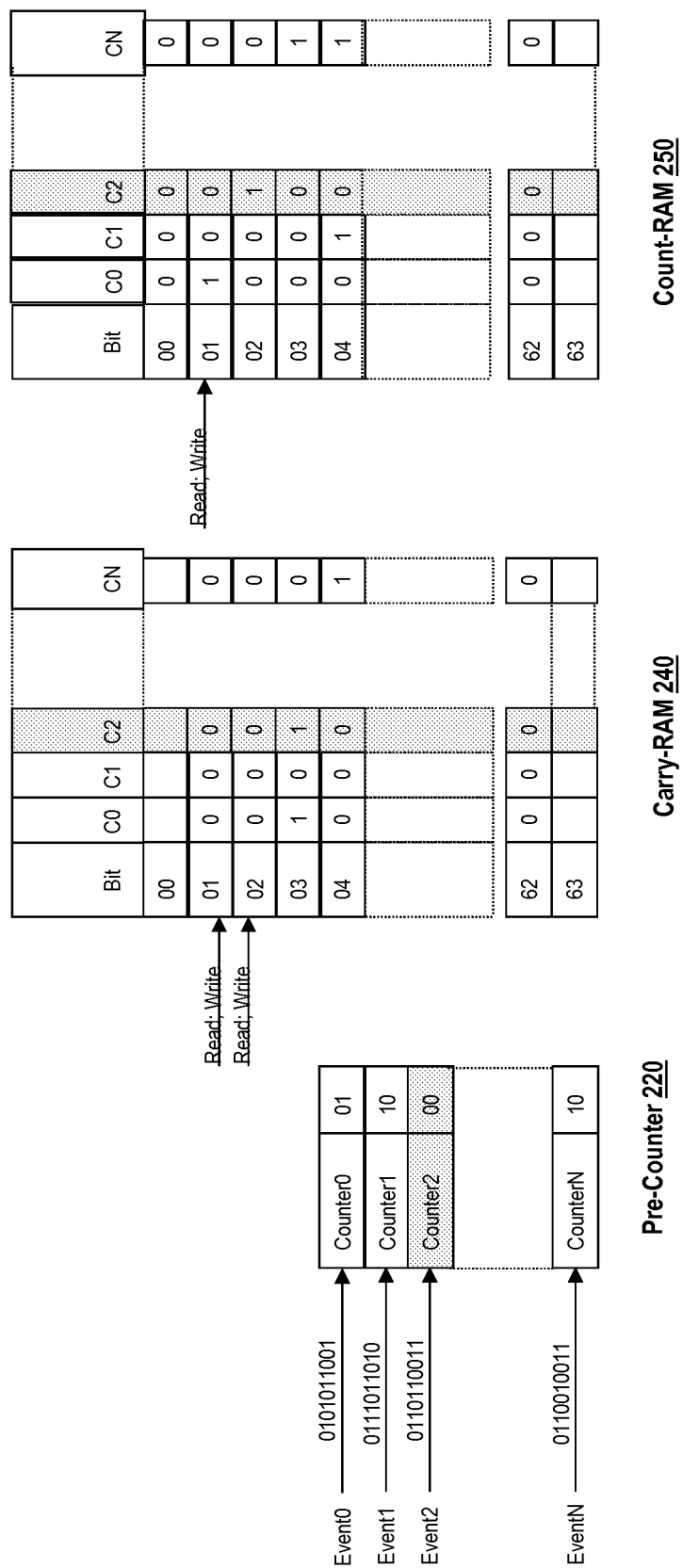
FIG. 5 shows a block diagram of an exemplary process for implementing designs and steps for determining a count in accordance with aspects of the invention.

FIG. 5 illustrates exemplary data in the pre-counters 220, the carry-RAM 240 and the count-RAM 250 that, together, represent the values of the counts from several event sources. In accordance with embodiments of the invention, the counters in the RAMs 240 and 250 are arranged in transposed fashion (i.e., vertically stored in bit-serial form). For instance, location [X] of the count-RAM 240 stores a corresponding bit [X] of the counter. The carry-RAM 250 stores carry-out values that are also arranged in a transposed, bit serial format. Thus, at each cycle, the counters are represented by columns of the counter-RAM 240 and the carry-RAM 250. The actual value of a particular event counter is the sum of its corresponding columns in both the count-RAM and the carry-RAM (in addition to whatever values is in the corresponding pre-counter at the time the value of the counter is determined, if any.)

For example, Event 2 generates the following time-ordered sequence of event pulses 0-1-1-0-1-1-0-0-1-1, wherein a logic "1" indicates that an event has occurred in that corresponding time cycle and a logic "0" indicates that no event occurred. The event pulses of Event 2 (e.g., 0-1-1-0-1-1-0-0-1-1) are queued as they are generated such that the earlier events are rightmost of later events. In Event 2, for example, the event pulse occurred in the following order: 1-1-0-0-1-1-

0-1-1-0, such that the next two event pulses that will be recorded in the pre-counter for Event 2 are 1-1.

In addition to the counts stored in the pre-counter (here, "0-0"), the current count for the exemplary event source is stored in the column labeled "Counter2" of the carry-RAM 250 and the count-RAM 240, which in this case are "0 . . . 0-1-0-0" and "0 . . . 0-0-1-0-0", respectively. The counter unit obtains the value of a particular counter by summing the contents the carry-RAM 240 and the count-RAM 250, and concatenating with the LSB value of the corresponding pre-counter 220. For example, for the example shown in FIG. 5, having the values 0-0, 0-1-0-0, and 0-0-1-0-0 for the pre-counter 220, the carry-RAM 250 and count-RAM 240, respectively, the value of the counter is 0-1-1-0-0-0 (i.e., 24 count) (("0100" & "0")+"00100) & 0" For another example (not illustrated), given the following exemplary values of 0-1, 0-1-0-0, and 0-0-1-0-0 for the pre-counter 220, the carry-RAM 250 and count-RAM 240, respectively, the value of the counter is 0-1-1-0-0-1 (i.e., 25 counts).

According to aspects of the invention, the counter unit 105 operates according to the following pseudo code is used to read out the value of the contents of the counter unit 105 when the counter unit is offline (i.e., stopped).

---
(1) /Mechanism to read out Counter contents while offline/
(2) (Column 'i' of Carry-RAM + Column 'i' of Counter RAM)
    & PreCount(i)(0)

---

Alternatively, when the counter unit 105 is online (i.e., running), the following pseudo code is used to read out the contents of the counter unit.

---
(1) /Mechanism to read out Counter contents while online/
(2) ((Column 'i' of Carry-RAM & PreCount(i)(1))+ Column 'i' of
    Counter RAM) & PreCount(i)(0)

---

In view of the foregoing, it will be appreciated that an implementation as embodied in accordance of the aspects of the present invention provides a number of advantages. The embodiments of the disclosed invention are highly scalable since only a single 2-bit pre-counter 220 is used per event source. Scalability is supported while performance is preserved. Particularly, designers do not have to limit the number of counters, nor do they need to multiplex many events with respect to a limited number of available counters.

Further, the use of transposed RAMs to store counts conserves the area required for the counter unit. In an IC, flip-flop based storage elements take three to four times more area compared to RAM based storage elements. For instance, the counter device illustrated in FIG. 2A is predicted to provide a net savings of 712 flip-flops, 641 adders at the cost of extra 64*128 RAM that may be required in a conventional system. In addition, the use of RAM hard-core reduces the number of placeable elements (pre-counter registers and increments), resulting in improved placement of the elements.

As described in the embodiment above, the counter unit is described with respect to high-speed serial protocols where in events could be distributed across several channels or applications necessitating the need for large number counters. The invention, however, is not limited to the particular embodiments. Other implementations may be used in Routers, Ethernet Adapters and other ASICs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Many modifications and variations will be apparent to those of ordinary skill in the art without departing from the scope and spirit of the invention. The corresponding structures, materials, acts, and equivalents of all means or step plus function elements in the claims, if applicable, are intended to include any structure, material, or act for performing the function in combination with other claimed elements as specifically claimed. Accordingly, while the invention has been described in terms of embodiments, those of skill in the art will recognize that the invention can be practiced with modifications and in the spirit and scope of the appended claims.

What is claimed:

1. A computer program product for implementing an event counter, the computer program product comprising a computer readable storage device having program code embodied therewith, the program code being readable and/or executable by a processor of a computer device to:
   provide, by the computer device, a count-memory, a carry-memory, and a pre-counter corresponding to an event source, wherein a column in the count-memory and a column in the carry-memory represent a value of the event counter; and
   store, by the computer device, a count of the event counter received via the pre-counter in the count-memory and the carry-memory in a transposed, bit-serial format, such that location zero of the count-memory and the carry-memory corresponds to a least significant bit of the event counter.

2. The computer program product of claim 1, wherein the program code is further readable and/or executable by the processor of the computer device to:
   update a value of the pre-counter;
   based on a current value of a predetermined visit schedule (K), selectively perform a full-bit addition of a value read from the count-memory at a bit position K with one of: the value of the pre-counter, and a value read from the carry-memory at the bit position K, wherein the full-bit addition generates a sum value and a carry value;
   update the column of the count-memory and the column of the carry-memory with the sum value and the carry value, respectively; and
   clear a most significant bit of each pre-counter when K is equal to zero and clearing each carry-memory content when K is not equal to zero.

3. The computer program product of claim 2, wherein the visit schedule (K) is a following sequence: 0, 1, 0, 2, 0, 1, 0, 3, 0, 1, 0, 2, 0, 4 . . . 0, 1, 0, 62.

4. The computer program product of claim 2, wherein the program code is further readable and/or executable by the processor of the computer device to add the value of the pre-counter and the value of a corresponding event of the event source.

5. The computer program product of claim 2, wherein the program code is further readable and/or executable by the processor of the computer device to:

when K is equal to zero, add the most significant bit (MSB) of the pre-counter and the value of the count-memory at the bit position K; and when K is not equal to zero, add the value of the column in the count-memory at the bit position K and the value of the column in the carry-memory at the bit position K.

6. The computer program product of claim 2, wherein the program code is further readable and/or executable by the processor of the computer device to:

set the carry-memory to zero at the bit position K; and set the carry-memory to the value of a corresponding carry value at a bit position K+1.

7. The computer program product of claim 2, wherein the program code is further readable and/or executable by the processor of the computer device to set the count-memory to a sum value at the bit position K.

8. The computer program product of claim 2, wherein the updating the pre-counter, the performing the full-bit addition, the updating the count-memory and the carry-memory, and the clearing are performed iteratively, wherein after each iteration, the event counter increments the value of K.

9. The computer program product of claim 1, wherein the program code is further readable and/or executable by the processor of the computer device to read out the value of the event counter from a column of the count-memory, a column of the carry-memory, and a value of the pre-counter.

10. A computer program product for implementing a plurality of event counters, the computer program product comprising a computer readable storage device having program code embodied therewith, the program code being readable and/or executable by a processor of a computer device to:

provide, by the computer device, a plurality of pre-counters corresponding to respective ones of the plurality of event counters and respective columns in a count-memory and a carry-memory, wherein each column in the count-memory and the carry-memory represents a corresponding one of the event counters in a transposed, bit-serial format, such that zero locations of the count-memory and the carry-memory correspond to the least significant bits (LSB) of the event counters;

update, by the computer device, the plurality of pre-counters in parallel;

perform, by the computer device, full-bit additions of the plurality of pre-counters in parallel; and update, by the computer device, the row bits of the count-memory and the row bits of the carry-memory in parallel with results of the full-bit additions from the corresponding pre-counters.

11. The computer program product of claim 10, wherein the performing the full-bit additions and the updating the columns of the count-memory and the columns of the carry-memory are performed based on a predetermined visit schedule (K).

12. The computer program product of claim 11, wherein the program code is further readable and/or executable by the processor of the computer device to, based on a current value of K, produce a sum value and a carry value corresponding to each of the plurality of event counters by adding the respective column of the count-memory at bit position K with one of the corresponding pre-counter and the corresponding column of the carry-memory at a bit position K.

13. The computer program product of claim 12, wherein the program code is further readable and/or executable by the processor of the computer device to:

when K is equal to zero, add a most significant bit (MSB) of the corresponding pre-counter and the corresponding column of the count-memory at the bit position K; and when K is not equal to zero, add the corresponding column in the count-memory at bit position K and the corresponding column in the carry-memory at the bit position K.

14. The computer program product of claim 13, wherein the updating the value of the plurality of pre-counters, the performing the full-bit additions, and the updating the columns of the count-memory and the columns of the carry-memory are performed iteratively, wherein after each iteration of the updating the columns of the count-memory and the columns carry-memory, when K is equal to zero, clearing the MSB of each of the pre-counters; and when K is not equal to zero, clearing the carry-memory at the bit positions corresponding to K.

15. The computer program product of claim 12, wherein the program code is further readable and/or executable by the processor of the computer device to, for each counter:

set the carry-memory to zero at bit position K; and set the carry-memory to a value of the carry value at the bit position K+1.

16. The computer program product of claim 15, wherein the program code is further readable and/or executable by the processor of the computer device to, for each counter, set the count memory to the value of the corresponding sum value at the bit position K.

17. The computer program product of claim 10, wherein the program code is further readable and/or executable by the processor of the computer device to, for each pre-counter, add the value of the pre-counter and a value of an event pulse from a corresponding event source.

18. The computer program product of claim 10, wherein the program code is further readable and/or executable by the processor of the computer device to:

stop the plurality of event counters; and read out the values of the plurality of event counters from a column of the respective count-memory, a column of the respective carry-memory, and a value of the respective pre-counter.

* * * * *